(12) United States Patent
Okubo et al.

(10) Patent No.: US 12,288,469 B2
(45) Date of Patent: Apr. 29, 2025

(54) ELECTRIFIED VEHICLE MANAGEMENT DEVICE AND ELECTRIFIED VEHICLE MANAGEMENT SYSTEM

(71) Applicant: TOYOTA JIDOSHA KABUSHIKI KAISHA, Toyota (JP)

(72) Inventors: Atsushi Okubo, Nisshin (JP); Kiyonori Yoshida, Toyota (JP); Kotomi Asano, Toyota (JP); Tamaki Ozawa, Toyota (JP); Yusuke Saigo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 274 days.

(21) Appl. No.: 18/087,403

(22) Filed: Dec. 22, 2022

(65) Prior Publication Data

US 2023/0267838 A1    Aug. 24, 2023

(30) Foreign Application Priority Data

Feb. 22, 2022    (JP) .................................. 2022-025765

(51) Int. Cl.
*G08G 1/00* (2006.01)
*B60L 53/60* (2019.01)

(52) U.S. Cl.
CPC .............. *G08G 1/207* (2013.01); *B60L 53/60* (2019.02)

(58) Field of Classification Search
CPC .......... B60L 53/68; B60L 53/66; B60L 53/60; B64U 70/95; H02J 13/00032; G07F 17/0014; G07F 15/06; H04L 9/3226; B60W 60/001; G07C 5/008; A61L 9/14; G08G 1/00; G08G 1/207
See application file for complete search history.

(56) References Cited

U.S. PATENT DOCUMENTS

| | | | |
|---|---|---|---|
| 10,078,924 B2 * | 9/2018 | Oesterling | G07C 5/008 |
| 11,097,742 B2 * | 8/2021 | Kanehara | B60W 60/001 |
| 11,449,823 B2 * | 9/2022 | Endo | H04L 9/3226 |
| 2009/0144149 A1 * | 6/2009 | Sakakibara | G07F 17/0014 705/14.62 |
| 2020/0198493 A1 * | 6/2020 | Muramatsu | H02J 13/00032 |
| 2021/0376402 A1 * | 12/2021 | Tsuchiya | B60L 53/66 |
| 2022/0169401 A1 * | 6/2022 | Di Cosola | B64U 70/95 |

FOREIGN PATENT DOCUMENTS

| | | | | |
|---|---|---|---|---|
| CA | 2983839 C | * | 2/2020 | A61L 9/14 |
| CN | 104574676 A | * | 4/2015 | G07F 15/06 |
| JP | 2009-134450 A | | 6/2009 | |
| JP | 2020-102025 A | | 7/2020 | |
| JP | 2021-191157 A | | 12/2021 | |

* cited by examiner

*Primary Examiner* — Yuri Kan
(74) *Attorney, Agent, or Firm* — Dinsmore & Shohl LLP

(57) ABSTRACT

The server (electrified vehicle management device) includes a communication unit (second communication unit) that communicates with a mobile terminal (first communication unit) of a user of the electrified vehicle. The server includes a processor (control unit) that controls the communication unit. Then, the processor controls the communication unit so that a permission signal permitted to receive a privilege in the amusement park is transmitted to the mobile terminal of the user when a predetermined condition is satisfied with respect to power control in a EVSE (power station) provided in the amusement park (entertainment facility).

8 Claims, 6 Drawing Sheets

ELECTRIFIED VEHICLE MANAGEMENT DEVICE AND ELECTRIFIED VEHICLE MANAGEMENT SYSTEM

CROSS-REFERENCE TO RELATED APPLICATION

This application claims priority to Japanese Patent Application No. 2022-025765 filed on Feb. 22, 2022, incorporated herein by reference in its entirety.

BACKGROUND

1. Technical Field

The present disclosure relates to an electrified vehicle management device and an electrified vehicle management system.

2. Description of Related Art

For example, a charging processing system described in Japanese Unexamined Patent Application Publication No. 2020-102025 (JP 2020-102025 A) includes power supply equipment and a server. The power supply equipment can provide $CO_2$-free power generated using renewable energy. The server issues a coupon usable at a store in the vicinity of the power supply equipment for a user of an electrified vehicle on which $CO_2$-free charging is performed. Accordingly, power supply in the power supply equipment around the store is promoted.

SUMMARY

In JP 2020-102025 A, as described above, by issuing a coupon usable in a store in the vicinity of the power supply equipment for the user of the electrified vehicle on which the $CO_2$-free charging is performed, power supply in the power supply equipment around the store is promoted. However, the charging processing system described in JP 2020-102025 A does not consider promoting power control such as charging in power supply equipment provided in an entertainment facility. Therefore, a server (electrified vehicle management device) capable of promoting power control such as charging by a user in power supply equipment (power station) provided in an entertainment facility is desired.

The present disclosure provides an electrified vehicle management device and an electrified vehicle management system capable of promoting power control such as charging by a user in a power station provided in an entertainment facility.

An electrified vehicle management device according to a first aspect of the present disclosure is an electrified vehicle management device for managing an electrified vehicle that is able to perform power control including at least one of power supply to a power system and charging from the power system. The electrified vehicle management device includes: a second communication unit for communicating with a first communication unit of a user of the electrified vehicle; and a control unit for controlling the second communication unit. The control unit controls the second communication unit such that, when a predetermined condition is satisfied regarding the power control in a power station provided in an entertainment facility, a permission signal that permits receiving a privilege in the entertainment facility is transmitted to the first communication unit of the user.

In the electrified vehicle management device according to the first aspect, as described above, when a predetermined condition is satisfied regarding the power control in a power station provided in an entertainment facility, the control unit controls the second communication unit such that a permission signal that permits receiving a privilege in the entertainment facility is transmitted to the first communication unit of the user. Accordingly, it is possible to increase the number of users who perform power control in the power station of the entertainment facility for the privilege. That is, it is possible to promote power control such as charging by a user in a power station provided in an entertainment facility.

In the electrified vehicle management device according to the first aspect, the entertainment facility may include an amusement park, a plurality of entertainment equipment be provided in the amusement park, and the permission signal include at least one of a signal that permits using at least a part of the entertainment equipment for free, and a signal that permits using at least a part of the entertainment equipment preferentially. With this configuration, it is possible to increase the number of users who perform power control in the power station of the amusement park for the privilege that can be used in the entertainment equipment of the amusement park. That is, it is possible to promote power control such as charging by a user in a power station provided in an amusement park.

In the electrified vehicle management device according to the first aspect, the entertainment facility may be provided with a first entrance that allows entering the entertainment facility and a second entrance that allows entering the entertainment facility and that is different from the first entrance, and the permission signal include a signal that permits using the second entrance. With this configuration, a user who is permitted to use the second entrance can preferentially enter the entertainment facility from the second entrance.

In the electrified vehicle management device according to the first aspect, the entertainment facility may be provided with an eating and drinking establishment, and the permission signal include a signal that permits reserving the eating and drinking establishment preferentially. With this configuration, the user who is permitted to preferentially reserve the eating and drinking establishment can easily reserve the eating and drinking establishment in which the user desires to eat and drink.

In some embodiments, the entertainment facility may include an amusement park, the second communication unit communicate with a terminal carried by an employee of the amusement park who is wearing a costume, and the control unit control the second communication unit such that an instruction to head to the reserved eating and drinking establishment is transmitted to the terminal of the employee at a reservation time of the user for the eating and drinking establishment. With this configuration, the user who has preferentially reserved the eating and drinking establishment can enjoy the performance and the like of the employee who is wearing a costume at the eating and drinking establishment.

In the electrified vehicle management device according to the first aspect, the control unit may perform control for adjusting the privilege permitted by the permission signal, based on a degree of contribution by the power control to a power supply and demand adjustment request from the power system. With such a configuration, it is possible to easily increase the motivation of the user for power control in the entertainment facility by appropriately adjusting the relationship between the contribution by the power control and the permitted privilege.

In the electrified vehicle management device according to the first aspect, the control unit may control the second communication unit such that the permission signal is transmitted to the first communication unit that is able to be carried by the user. Here, when the permission signal is transmitted to a non-portable communication unit, it is necessary to transfer the permission signal from the non-portable communication unit to the portable first communication unit. Therefore, the time and effort of the user increases. On the other hand, when the permission signal is transmitted to the portable first communication unit, the above-described transfer time and effort can be omitted. That is, it is possible to reduce the time and effort for using the first communication unit in which the permission signal is received in the entertainment facility.

In the electrified vehicle management device according to the first aspect, the predetermined condition may include that the user responds to a power supply and demand adjusting request from the power system and that the electrified vehicle is electrically connected to the power station. With this configuration, it is possible to suppress the user from acquiring the permission signal without performing power control. As a result, it is possible to suppress the permission signal from being acquired by a malicious user.

An electrified vehicle management system according to a second aspect of the present disclosure includes: a power station provided in an entertainment facility; and an electrified vehicle management device for managing an electrified vehicle that is able to perform power control including at least one of power supply to a power system and charging from the power system. The electrified vehicle management device includes a second communication unit for communicating with a first communication unit of a user of the electrified vehicle, and a control unit for controlling the second communication unit. The control unit is configured to control the second communication unit such that, when a predetermined condition is satisfied regarding the power control in the power station, a permission signal that permits receiving a privilege in the entertainment facility is transmitted to the first communication unit of the user.

In the electrified vehicle management system according to the second aspect, as described above, when a predetermined condition is satisfied regarding the power control in a power station provided in an entertainment facility, the control unit controls the second communication unit such that a permission signal that permits receiving a privilege in the entertainment facility is transmitted to the first communication unit of the user. Accordingly, it is possible to increase the number of users who perform power control in the power station of the entertainment facility for the privilege. In other words, an electrified vehicle management system capable of promoting power control such as charging by a user in a power station provided in an entertainment facility can be provided.

According to the present disclosure, it is possible to promote power control such as charging by a user in a power station provided in an entertainment facility.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
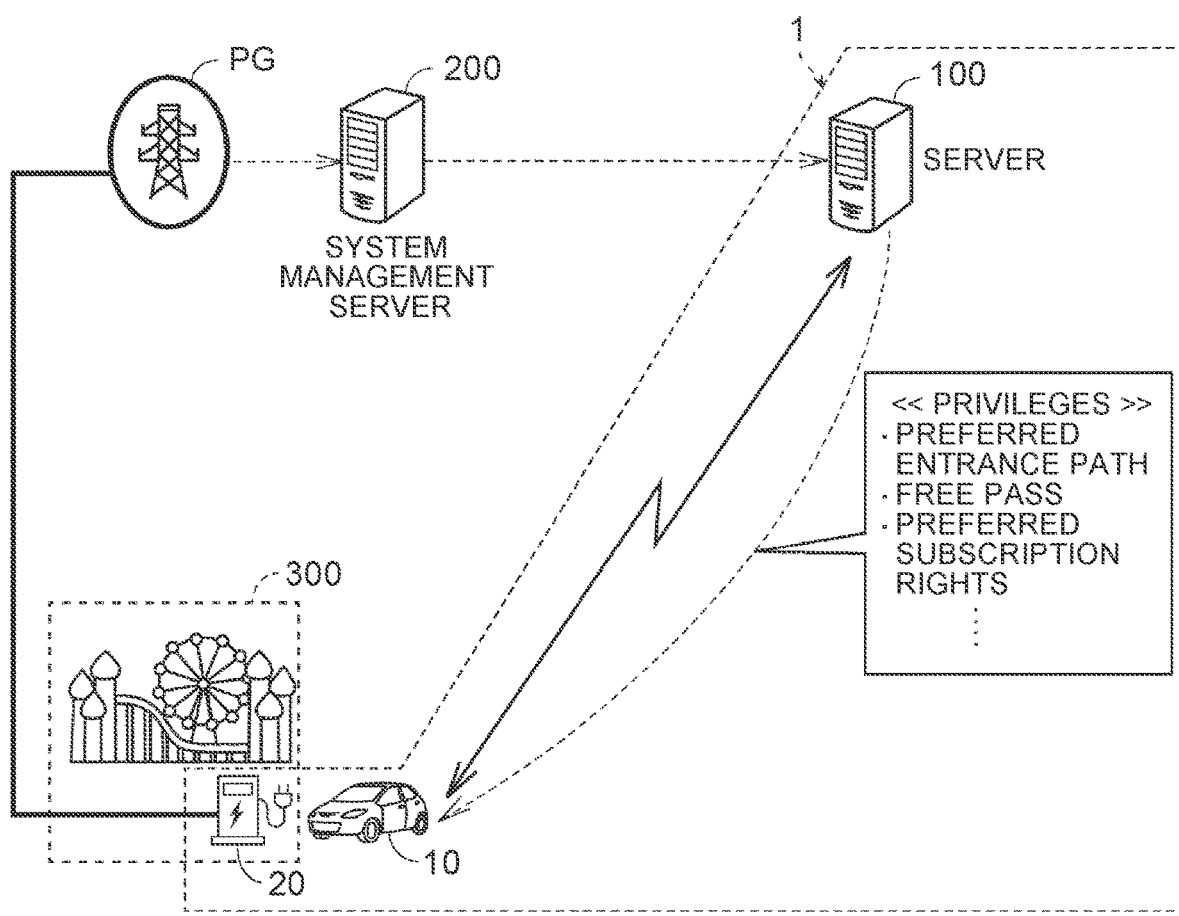
FIG. 1 is a diagram illustrating a management system and a system management server for managing a server according to an embodiment.

Hereinafter, embodiments of the present disclosure will be described in detail with reference to the drawings. In the drawings, the same or corresponding parts are denoted by the same reference numerals, and the description thereof will not be repeated.

FIG. 1 is a diagram illustrating a schematic configuration of a management system 1, a system management server 200, and a power system PG that manage a server 100 according to an embodiment of the present disclosure. Note that the server 100 and the management system 1 are examples of the "electrified vehicle management device" and the "electrified vehicle management system" of the present disclosure, respectively.

The management system 1 is a system that manages (includes) the servers 100, the electrified vehicles 10, and Electrified Vehicle Supply Equipment (EVSE) 20. The server 100 is configured to be able to communicate (wirelessly communicate) with each of the system management server 200, the electrified vehicle 10, and the mobile terminal 14 (see FIG. 2) described later. EVSE 20 is provided in the amusement park 300. The management system 1 manages a plurality of EVSE 20 provided in the amusement park 300. EVSE 20 and the amusement park 300 are exemplary "power stations" and "entertainment facilities" of the present disclosure, respectively.

The power system PG is a power grid constructed by a power plant and a transmission and distribution facility (not shown). In this embodiment, the electric power company also serves as a power generation company and a power transmission and distribution company. The electric power company corresponds to a general power transmission and distribution company. Electric utility companies maintain and manage power system PG. The electric power companies correspond to administrators of the power system PG.

The system management servers 200 manage the supply and demand of the power system PG (power grid). The system management server 200 belongs to an electric power company. Based on the power generation and the power consumption by the respective power adjustment resources managed by the system management server 200, the system management server 200 transmits a request (supply-demand adjustment request) for adjusting the power demand of the power system PG to the server 100. Specifically, when the generated power or the power consumption of the power adjustment resource is expected to be larger than normal (or is currently larger), the system management server 200 transmits a request to increase or decrease the power demand amount compared to the normal time to the server 100.

The server 100 is a server managed by an aggregator. An aggregator is an electric utility that provides an energy management service by bundling a plurality of power adjustment resources such as a region and a predetermined facility.

The servers 100 request the electrified vehicles 10 to perform control (hereinafter, simply referred to as "power control") including power supply to the power system PG (external power supply) and charge from the power system PG (external charge) as one of the techniques for increasing or decreasing the power demand of the power system PG. The server 100 transmits a request signal for making the request to the electrified vehicle 10 to the mobile terminal 14 (see FIG. 2) or the like owned by the electrified vehicle 10 or the user of the electrified vehicle 10.

Further, the servers 100 are configured to manage information (hereinafter, also referred to as "vehicle information") of the plurality of registered electrified vehicles 10, information (hereinafter, also referred to as "user information") of the respective registered users, and information (hereinafter, also referred to as "EVSE information") of the registered EVSE 20. The user information, the vehicle information, and EVSE information are distinguished by the identification information (ID) and stored in the memory 102 (see FIG. 2).

The user ID is identification information for identifying the user. The user ID also functions as a terminal ID for identifying the mobile terminal 14 (see FIG. 2) carried by the user. The servers 100 are configured to store information received from the mobile terminals 14 separately for each user ID. The user data includes a communication address of the mobile terminal 14 carried by the user and a vehicle ID of the electrified vehicle 10 belonging to the user.

The vehicle ID is identification information for identifying the electrified vehicle 10. The vehicle ID may be a license plate or may be a Vehicle Identification Number (VIN). The vehicle information includes an action schedule of each electrified vehicle 10.

EVSE-ID is identification information for identifying EVSE 20. EVSE data includes the communication addresses of the respective EVSE 20 and the status of the electrified vehicles 10 connected to the respective EVSE 20. EVSE information also includes information (for example, a combination of an EVSE-ID and a vehicle ID) indicating a combination of the electrified vehicle 10 and EVSE 20 connected to each other.

The electrified vehicle 10 is configured to be capable of power control including external power supply and external charging. The power control is performed between the electrified vehicles 10 and the power system PG via an EVSE 20. The electrified vehicles 10 include, for example, Plug-in Hybrid electrified vehicle (PHEV), Battery electrified vehicle (BEV), and Fuel Cell electrified vehicle (FCEV). Further, the electrified vehicle 10 may include at least one of a vehicle Personally Owned Vehicle (POV) owned by a person and a vehicle (MaaS vehicle) managed by a Mobility as a Service (MaaS). Note that the electrified vehicle 10 may be configured to be capable of only one of external power supply and external charging.

The electrified vehicle 10 includes a traveling motor 11 (see FIG. 2) and a battery 12 (see FIG. 2) that supplies electric power to the traveling motor 11. The battery 12 includes a secondary battery that stores electric power for traveling. The secondary battery is an assembled battery including a plurality of lithium ion batteries or a plurality of nickel hydrogen batteries. Instead of the secondary battery, another power storage device such as an electric double layer capacitor may be employed as the battery 12.

In addition, the electrified vehicles 10 may include Data Communication Module (DCM) or a communication I/F compatible with a fifth-generation mobile communication system (5G).

EVSE 20 means a vehicular power supply facility. The electrified vehicles 10 are configured to be electrically connectable to an EVSE 20. For example, the charge cable 21 (see FIG. 2) connected to EVSE 20 is connected to the inlet of the electrified vehicle 10, so that electric power can be exchanged between EVSE 20 and the electrified vehicle 10. The number of EVSE 20 managed by the management-system 1 (provided in the amusement park 300) is arbitrary. The number of EVSE 20 managed by the management-system 1 may be about 5, 10 or more, or 100 or more.

EVSE 20 includes a DC type EVSE. Therefore, DC power is supplied from the electrified vehicles 10 to EVSE 20, and DC/AC is converted by inverters built in EVSE 20. The charger/discharger 13 (see FIG. 2) adjusts the charge/discharge power of the battery 12 of the electrified vehicle 10. The charger/discharger 13 is configured to adjust the charge/discharge power by, for example, DC/DC converters. However, in some embodiments, the EVSE 20 is a DC system. In some embodiments, the EVSE 20 may be of AC type.

Figure 2:
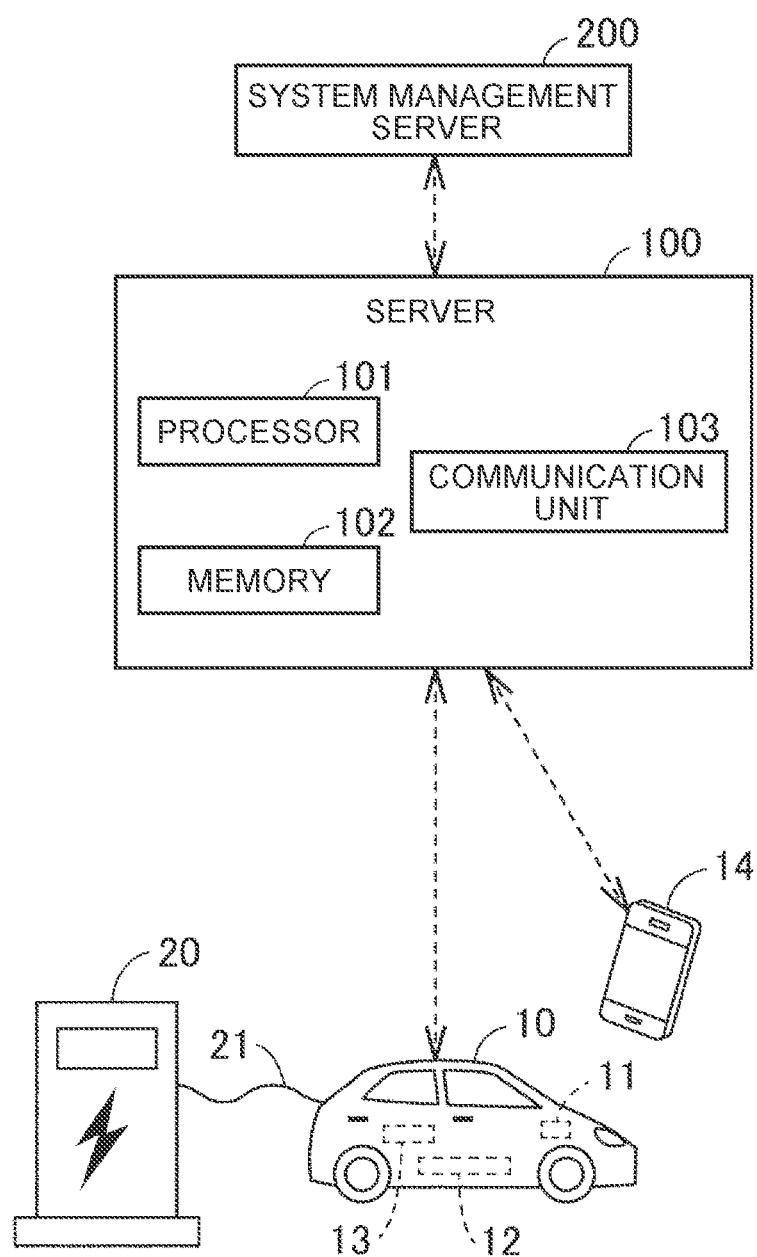
FIG. 2 is a diagram illustrating a detailed configuration of a server and an electrified vehicle according to an embodiment.

As illustrated in FIG. 2, the server 100 includes a processor 101, a memory 102, and a communication unit 103. The processor 101 and the communication unit 103 are examples of the "control unit" and the "second communication unit" of the present disclosure, respectively.

The memory 102 stores a program to be executed by the processor 101 and information (for example, a map, a mathematical expression, and various parameters) used in the program. The communication unit 103 includes various communication I/F. The processor 101 controls the communication unit 103. Specifically, the processor 101 communicates with the system management server 200 through the communication unit 103. The processor 101 communicates with a mobile terminal 14 (for example, a smartphone or a tablet) that can be carried by a user through the communication unit 103. The processor 101 communicates with DCM and the like of the electrified vehicles 10 through the communication unit 103.

There is known a power management system that provides a preferential service that can be used in a store around a EVSE 20 to a user of the electrified vehicle 10 that has performed power control. However, this charging process does not consider promoting power control such as charging in an EVSE 20 provided in an entertainment facility such as the amusement park 300. Therefore, it is desired to promote electric power control such as charging by a user in an EVSE 20 provided in an entertainment facility such as amusement park 300.

Therefore, in the present embodiment, when a predetermined condition is satisfied with respect to the power control in EVSE 20 provided in the amusement park 300, the processor 101 controls the communication unit 103 so that a permission signal permitted to receive a privilege in the amusement park 300 is transmitted to the mobile terminal 14 of the user. That is, based on the control (command) by the processor 101, the communication unit 103 transmits the permission signal to the mobile terminal 14.

The communication unit 103 may transmit the permission signal to DCM or the like of the electrified vehicle 10. In this case, the user may transfer the permission signal transmitted to the electrified vehicle 10 to the mobile terminal 14.

Further, the predetermined condition includes both that the user responds to the demand-supply/demand-adjustment request from the power system PG (indicating that the user participates in the power control), and that the electrified vehicles 10 are electrically connected to EVSE 20 of the amusement park 300. That is, if the user does not electrically connect the electrified vehicles 10 to EVSE 20 while responding to the power supply-demand adjusting demand, the user is not permitted to receive the privilege. Further, even if the user electrically connects the electrified vehicles 10 to EVSE 20 without responding to the demand for adjusting the power supply and demand, the user is not permitted to receive the privilege.

Note that the permission signal may be transmitted to the user on condition that the power control is performed for a predetermined time or more (for example, 15 minutes or more) (or that a setting for performing the power control for a predetermined time or more is performed by the user). In addition, when the electrified vehicles 10 are electrically connected to EVSE 20, the permission signal may be transmitted to the user even if the user does not respond to the power supply-demand adjusting request.

In addition, when the user responds to the power supply-demand adjusting request, the permission signal may be transmitted to the user prior to the electrified vehicles 10 being electrically connected to EVSE 20. In this case, the transmitted permission signal may be enabled based on the fact that the electrified vehicles 10 are electrically connected to EVSE 20.

It should be noted that a user who has not performed power control despite obtaining a permission signal to which the privilege is permitted may be penalized in the next power control in EVSE 20 of the amusement park 300 or in EVSE 20 of other facilities. Specifically, even if the user performs power control, a predetermined reward (such as the permission signal or monetary reward) may not be given to the user.

Figure 3:
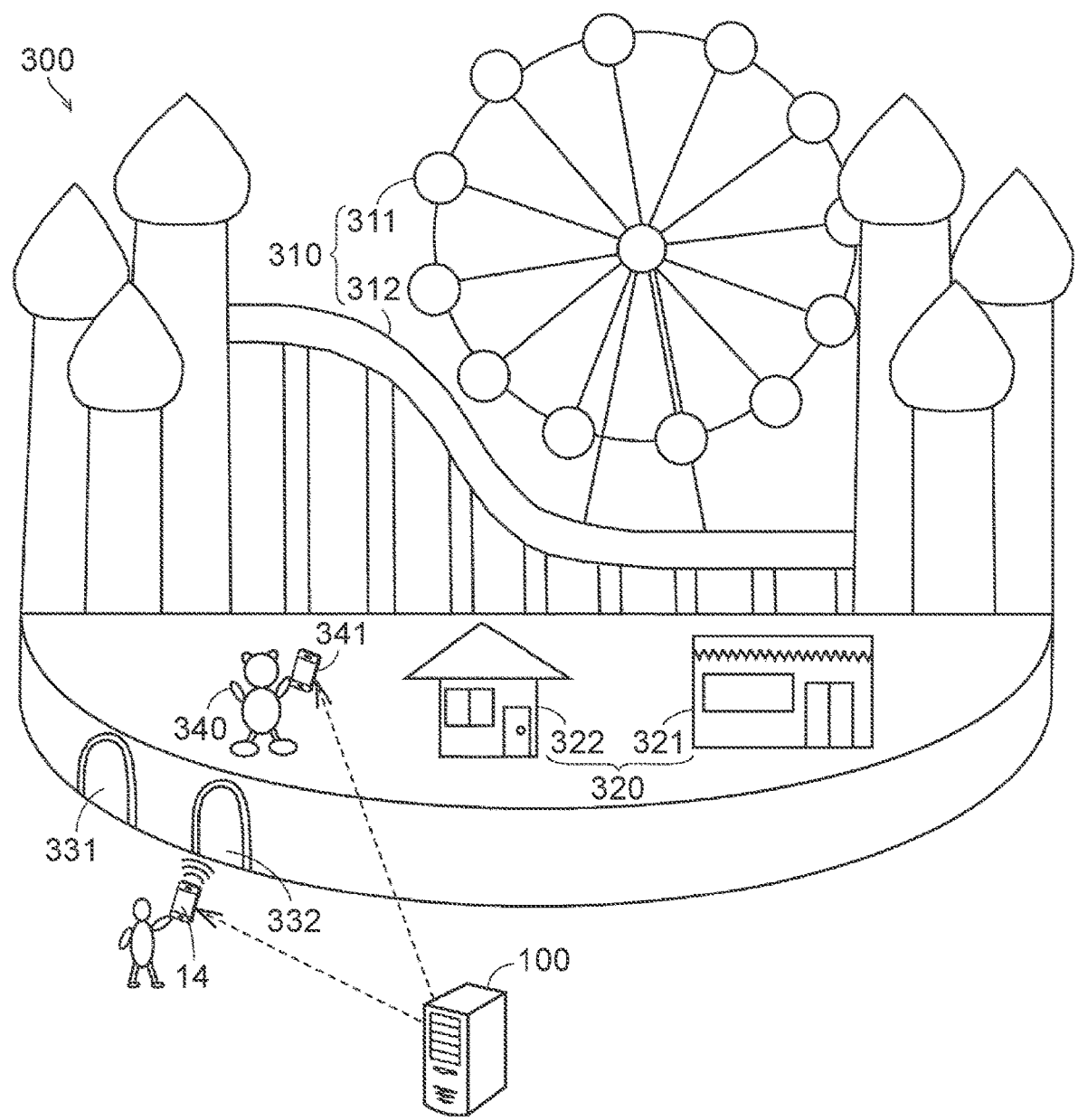
FIG. 3 is a diagram illustrating an example of a configuration of an amusement park.

Here, as shown in FIG. 3, a plurality of entertainment facilities 310 is provided in the amusement park 300. For example, the entertainment facility 310 includes a watch wheel 311, a jet coaster 312, and the like. In addition, a plurality of restaurants 320 is provided in the amusement park 300. For example, the restaurant 320 includes a western restaurant 321, a Japanese restaurant 322, and the like. Note that the configuration of the amusement park 300 is merely an example, and is not limited to the above example. For example, only one restaurant 320 may be provided in the amusement park 300.

In the present embodiment, the permission signal includes a signal permitted to use at least a part of the plurality of entertainment facilities 310 for free. In addition, the permission signal includes a signal that is permitted to preferentially use at least a part of the plurality of entertainment facilities 310. For example, a user acquiring the authorization signal may be able to enter the entertainment facility 310 from a dedicated entrance separate from an entrance to which a normal user (a user not acquiring the authorization signal) enters. Note that the permission signal may include only one of a signal permitted to use at least a part of the plurality of entertainment facilities 310 for free, and a signal permitted to preferentially use at least a part of the plurality of entertainment facilities 310.

In addition, the permission signal may include a signal in which a privilege is permitted in at least a part of the plurality of restaurants 320. The privileges in the restaurant 320 may include a discount on the restaurant price, a free and one-item additional service, and the like.

The amusement park 300 is provided with a normal entrance 331 that can enter the amusement park 300 and a priority entrance 332 that can enter the amusement park 300 and is different from the normal entrance 331. Note that the normal entrance 331 and the preferential entrance 332 are examples of the "first entrance" and the "second entrance" of the present disclosure, respectively.

In the present embodiment, the grant signal includes a signal that is permitted to use the priority entrance 332. For example, the priority entrance 332 may be opened by holding the mobile terminal 14 on which the permission signal is received over a sensor or the like provided in the priority entrance 332.

In addition, the permission signal includes a signal that is permitted to preferentially reserve the restaurant 320. Specifically, by using the mobile terminal 14 that has received the permission signal, it is possible to use a reservation frame that cannot be reserved by a normal user (a user who has not acquired the permission signal). For example, the reservation frame may be made available by inputting a password included in the permission signal at a reservation site of the restaurant 320.

In addition, the communication unit 103 of the server 100 communicates with a terminal 341 (for example, a smartphone or a tablet) carried by the employee 340 of the amusement park 300 that has been disguised. It should be noted that the employee 340 dresses a character in the amusement park 300, for example, by dressing the character.

Figure 4:
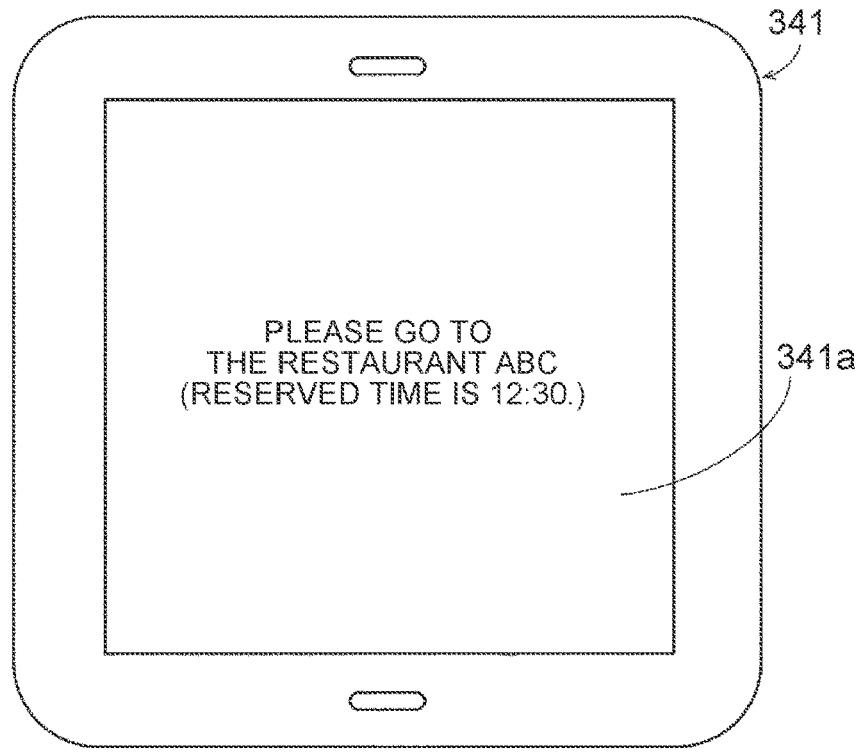
FIG. 4 is a diagram illustrating an example of a terminal of an employee of an amusement park.

In the present embodiment, the processor 101 of the server 100 controls the communication unit 103 so that an instruction toward the restaurant 320 reserved by the terminal 341 of the employee 340 is transmitted to the user's reservation time in the restaurant 320. As a result, on the display screen 341a (see FIG. 4) of the terminal 341 of the employee 340, a message is displayed instructing the employee 340 to go to the restaurant 320 reserved by the user. In addition, the appointment period may be displayed on the display screen 341a together with the message. The processor 101 may be configured to transmit the message to the terminal 341 of the employee 340, for example, a predetermined time before the reservation time (for example, 5 minutes before the reservation time).

The processor 101 may detect the position of the terminal 341 of the employee 340 by a Global Positioning System (GPS provided in the terminal 341 or the like. The processor 101 may transmit the message to the terminal 341 located closest to the restaurant 320 reserved by the user based on the detection result of GPS or the like.

In the present embodiment, the processor 101 adjusts the privilege permitted by the permission signal based on the degree of contribution by the power control to the power supply/demand adjustment request from the power system PG. For example, the processor 101 may perform control to increase the number of the entertainment facilities 310 (the restaurant 320) that can receive the privilege and the like when the degree of contribution is large. In addition, the processor 101 may perform control to increase a time period during which a privilege can be received in the entertainment facility 310 (the restaurant 320) when the degree of contribution is large.

The processor 101 calculates the degree of contribution based on, for example, the contents (charge/discharge time, charge/discharge amount) agreed between the electrified vehicle 10 and the server 100. Further, the processor 101 may calculate the contribution based on the agreed content and the content of the power control executed by the electrified vehicle 10 (charge/discharge time, charge/discharge amount). Further, the processor 101 may calculate the degree of contribution based on the amount of change in SOC of the electrified vehicle 10 due to the external charge (power supply), the absolute amount of the exchanged electric power, and the like.

The permission signal is transmitted to the mobile terminal 14 while the electric power control by the electrified vehicle 10 is performed (while the electrified vehicle 10 and EVSE 20 are electrically connected). The permission signal may be transmitted to the mobile terminal 14 after the power control is completed.

Further, the processor 101 controls the communication unit 103 so that a permission signal for permitting the privilege selected (requested) by the user is transmitted to the mobile terminal 14. That is, the user can select an arbitrary privilege from a plurality of privileges prepared in advance. Then, the communication unit 103 transmits a permission signal for permitting the privilege selected by the user to the mobile terminal 14 of the user.

Figure 5:
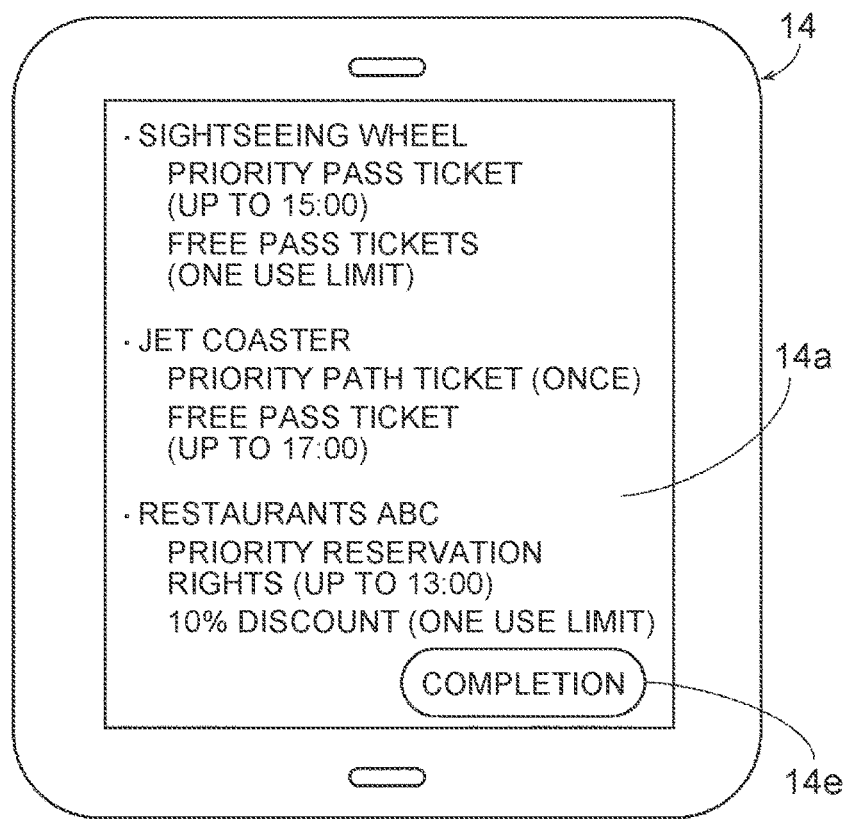
FIG. 5 is a diagram illustrating an example of a privilege selection screen.

Here, as illustrated in FIG. 5, the processor 101 may cause the mobile terminal 14 of the user to display a privilege selection screen 14a. On the selection screen 14a, a list of privileges available in the amusement park 300 is displayed. The privilege selected by the user in the selection screen 14a is available in the entertainment facility 310 (the restaurant 320) corresponding to the selected privilege. The type (number) and the like of the selectable privilege are determined based on the degree of contribution. The available period (or the number of usable times) corresponding to the privileges determined based on the degree of contribution may be displayed on the selection screen 14a. Note that the selection screens 14a illustrated in FIG. 5 is merely an example, and the present disclosure is not limited thereto.

The processor 101 randomly selects a privilege to be permitted to the user when there is no request for selection of a privilege by the user. The type (number) and usable period of the privilege selected by the processor 101 are determined based on the contribution.

Electrified Vehicle Management Method

Figure 6:
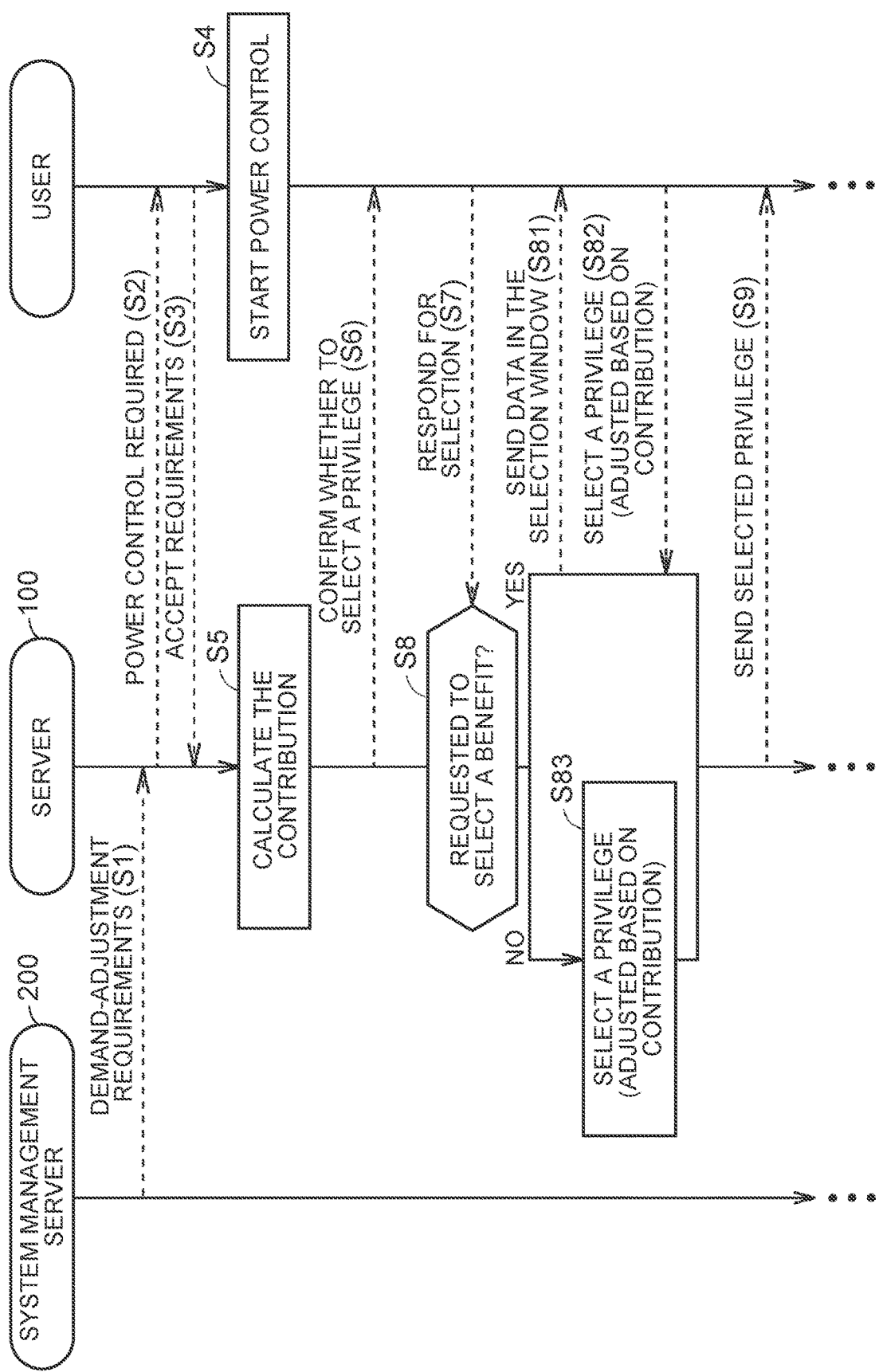
FIG. 6 is a sequential diagram illustrating control of servers and the like according to one embodiment.

Next, a method of managing the electrified vehicle 10 by the server 100 will be described with reference to the sequence diagram of FIG. 6.

First, in the step-wise S1, the server 100 (the communication unit 103) receives a demand/supply adjustment request for electric power from the system management server 200. As described above, the system management server 200 transmits the supply-and-demand adjustment request to the server 100 based on the power generation and consumption by the power adjustment resources managed by the system management server 200.

Next, in the step S2, the server 100 (the processor 101) requests the user of the electrified vehicle 10 to perform power control (external charging or external power supply) based on the supply-demand adjusting request received in the step S1. Note that the server 100 may directly transmit an inquiry signal for requesting power control to the electrified vehicle 10 or may transmit the inquiry signal to the mobile terminal 14 of the user.

Next, in the step S3, it is assumed that the user transmits to the server 100 that the user accepts the power control request in the step S2 (that the user participates in the power control).

Next, in step S4, it is assumed that the electrified vehicle 10 is electrically connected to EVSE 20, and thus starts power control corresponding to a demand for power control in step S2.

Next, in a stepping S5, the servers 100 (processor 101) calculate the user's contribution to power control. For example, the processor 101 calculates the degree of contribution based on the content (charge/discharge time, charge/discharge amount) agreed between the electrified vehicles 10 and the servers 100 in the steps S2 and S3. Further, the contribution degree may be calculated on the basis of the integrated value of the power control by the user (the number of times of the power control so far, the integrated value of the charge (discharge) amount so far, and the like). Note that the degree of contribution in the step S5 may be calculated between the step S3 and the step S4.

Figure 7:
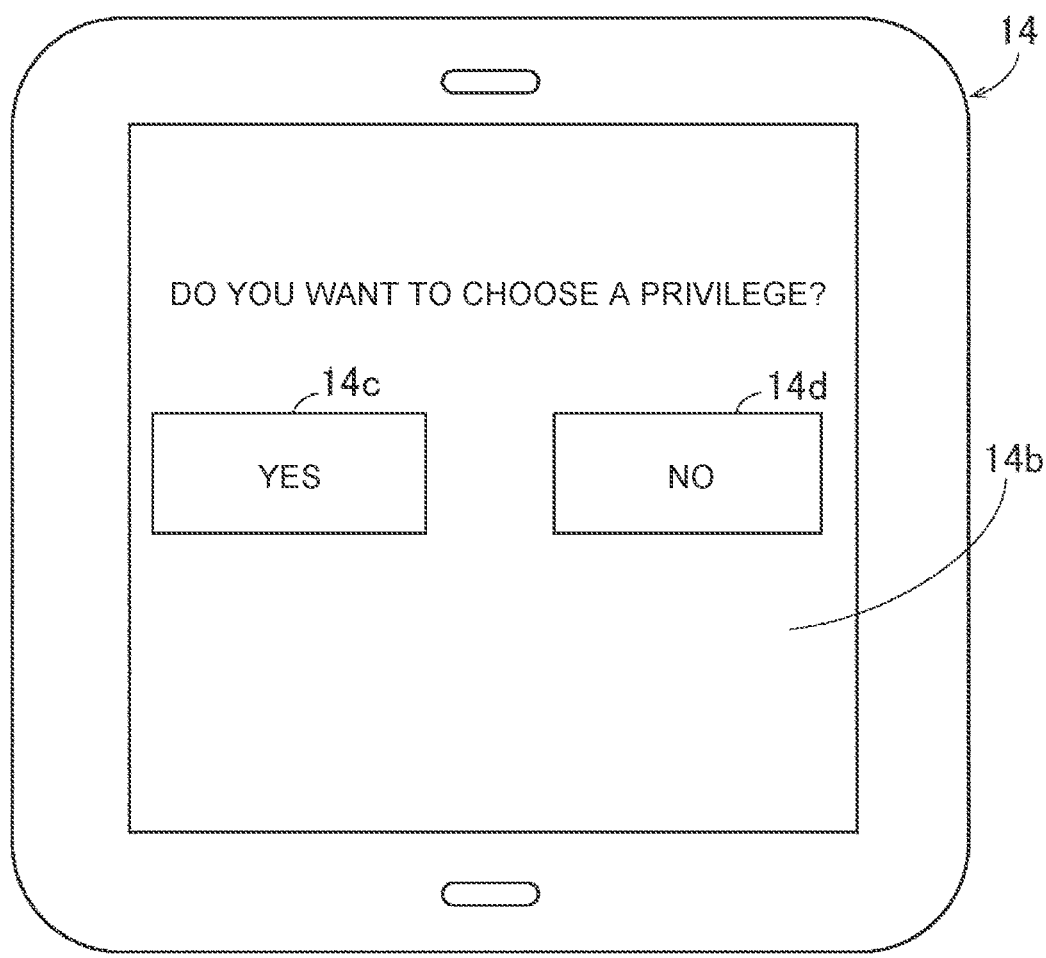
FIG. 7 is a diagram illustrating an example of a message screen for confirming whether to request selection of a privilege.

Next, in the step-wise S6, the server 100 (the processor 101) checks with the user whether or not to select a privilege to be used. For example, the server 100 (the processor 101) may control the communication unit 103 so that a message-screen 14b (see FIG. 7) for confirming whether or not to select a privilege is displayed on the mobile terminal 14 (or the electrified vehicle 10) of the user. On the message screen 14b, a button 14c described as "YES" and a button 14d described as "NO" are displayed. When the button 14c described as "YES" is selected, information indicating that a privilege is requested to be selected is transmitted to the server 100. When the button 14d described as "NO" is selected, information indicating that the selection of the privilege is not requested is transmitted to the server 100. Further, the process of the step S6 may be performed prior to the process of the step S5.

Next, in the step S7, it is assumed that the user has responded to the confirmation in the step S6. That is, it is assumed that one of the button 14c described as "YES" and the button 14d described as "NO" in the message screen 14b is selected.

Next, in the step-wise S8, the server 100 (the processor 101) determines whether or not the user requests to select a privilege. When the user requests to select a privilege in the step S7 (that is, when the button 14c described as "YES" is selected), the server 100 (the processor 101) determines that there is the selection request (Yes in the step S8), and the process proceeds to the step S81. If the user does not request to select a privilege in the step S7 (that is, if the button 14d described as "NO" is selected), the server 100 (the processor 101) determines that the selection request is not made (No in the step S8), and the process proceeds to the step S83.

In S81 of steps, the server 100 (the processor 101) controls the communication unit 103 so that the data of the privilege selection screen 14a (see FIG. 5) is transmitted to the mobile terminal 14 of the user. As a result, the selection screen 14a is displayed on the mobile terminal 14. At this time, the type (number) of the privilege selectable in the selection screen 14a, the available period, and the like are adjusted (limited) based on the degree of contribution calculated in S5 of steps.

Next, in the step-wise S82, the user selects at least one of the plurality of privileges displayed on the selection screen 14a. For example, when at least one of the privileges displayed on the selection screen 14a is selected and a button 14e (see FIG. 5) described as "completed" in the selection screen 14a is selected, the information of the privilege selected by the user may be transmitted to the servers 100.

On the other hand, in the step-by-step S83, the server 100 (the processor 101) randomly selects at least one of a plurality of privileges prepared in advance. At this time, the server 100 (the processor 101) adjusts the type (number) of the privilege to be selected, the available period, and the like based on the contribution level. The processor 101 may select a privilege by referring to a history of use of a user's past privilege or the like.

Next, in the step S9, the server 100 (the processor 101) controls the communication unit 103 such that a permission signal for permitting the privilege selected in the step S82 or the step S83 is transmitted to the mobile terminal 14 of the user. The user can receive the above-described various privileges by receiving the permission signal.

Note that the server 100 (the processor 101) may terminate the transmission of the permission signal based on the termination of the power control by the user (the electrical connection between the electrified vehicle 10 and EVSE 20 is released).

As described above, in the present embodiment, the processor 101 controls the communication unit 103 so that a permission signal permitted to receive a privilege in the amusement park 300 is transmitted to the mobile terminal 14 of the user when a predetermined condition is satisfied with respect to the power control in EVSE 20 provided in the amusement park 300. As a result, a privilege that can be used in the amusement park 300 is given by performing the power control. Therefore, it is possible to increase the number of users who use the amusement park 300 for a privilege.

Further, in the above embodiment, an example is shown in which the number (type) of privileges permitted and the like are adjusted based on the degree of contribution to the power control. However, the present disclosure is not limited to this. The number (type) of privileges permitted may be fixed (uniform) regardless of the degree of contribution.

In the above-described embodiment, an example has been described in which the server 100 transmits a permission signal for permitting a privilege to the user. However, the present disclosure is not limited to this. A server separate from the server 100 may receive a command from the server 100 and transmit the permission signal to the user.

Further, in the above embodiment, an example in which a privilege is permitted in the amusement park 300 has been described. However, the present disclosure is not limited to this. Benefits such as those described above may be provided in entertainment (enjoyment) facilities other than amusement parks (e.g., aquariums, movie theaters, shopping malls, resort areas, ski areas, camping areas, and the like).

Further, in the above embodiment, an example has been described in which the permission signal includes a signal that is permitted to use at least a part of the plurality of entertainment facilities 310 for free. However, the present disclosure is not limited to this. For example, the user who has obtained the permission signal may be permitted to enter the amusement park 300 at an admission fee discounted from the list price.

Further, in the above-described embodiment, an example of a privilege is shown that the entertainment facility 310, the restaurant 320, and the like can be used (reserved) preferentially. However, the present disclosure is not limited to this. For example, it may be a privilege to receive one product of the amusement park 300 for free.

Further, in the above-described embodiment, an example has been described in which the server 100 (the processor 101) confirms whether or not to select a privilege to the user. However, the present disclosure is not limited to this. The server 100 (the processor 101) may be configured to perform either one of a process of transmitting a privilege selected by the user to the mobile terminal 14 or a process of transmitting a privilege randomly selected by the user to the mobile terminal 14 without performing the above confirmation.

Further, in the above embodiment, an example has been described in which the permission signal includes a signal that is permitted to preferentially reserve the restaurant 320. However, the present disclosure is not limited to this. For example, the permission signal may include a signal that is permitted to preferentially enter the restaurant 320.

It should be noted that the above-described various modifications may be arbitrarily combined and adapted to the configuration of the above-described embodiment.

The embodiments disclosed herein should be considered to be exemplary and not restrictive in all respects. The scope of the present disclosure is shown by the scope of claims rather than the description of the above embodiments, and is intended to include all modifications within the meaning and the scope equivalent to the scope of claims.

What is claimed is:

1. An electrified vehicle management device configured for managing a power control of an electrified vehicle, the power control being a request to the electrified vehicle to perform the power control including at least one of a power supply to a power system and a charging from the power system, the electrified vehicle is configured to perform the power control including performing at least one of the power supply to the power system and the charging from the power system, the electrified vehicle management device comprising:
    a second communication unit for communicating with a first communication unit owned by a user of the electrified vehicle; and
    a control unit configured for controlling the second communication unit, the control unit being configured to control the second communication unit such that, when a predetermined condition is satisfied regarding the power control in a power station provided in an entertainment facility, a permission signal that permits receiving a privilege in the entertainment facility is transmitted to the first communication unit of the user,
    wherein the predetermined condition includes that the user responds to a power supply and demand adjusting request from the power system and that the electrified vehicle is electrically connected to the power station.

2. The electrified vehicle management device according to claim 1, wherein:
    the entertainment facility includes an amusement park;
    a plurality of entertainment equipment is provided in the amusement park; and
    the permission signal includes at least one of a signal that permits using at least a part of the entertainment equipment for free, and a signal that permits using at least a part of the entertainment equipment preferentially.

3. The electrified vehicle management device according to claim 1, wherein:
    the entertainment facility is provided with a first entrance that allows entering the entertainment facility and a second entrance that allows entering the entertainment facility and that is different from the first entrance; and
    the permission signal includes a signal that permits using the second entrance.

4. The electrified vehicle management device according to claim 1, wherein:
    the entertainment facility is provided with an eating and drinking establishment; and the permission signal includes a signal that permits reserving the eating and drinking establishment preferentially.

5. The electrified vehicle management device according to claim 4, wherein:
the entertainment facility includes an amusement park;
the second communication unit communicates with a terminal carried by an employee of the amusement park who is wearing a costume; and
the control unit controls the second communication unit such that an instruction to head to the reserved eating and drinking establishment is transmitted to the terminal of the employee at a reservation time of the user for the eating and drinking establishment.

6. The electrified vehicle management device according to claim 1, wherein the control unit performs control for adjusting the privilege permitted by the permission signal, based on a degree of contribution by the power control to the power supply and demand adjustment request from the power system.

7. The electrified vehicle management device according to claim 1, wherein the control unit controls the second communication unit such that the permission signal is transmitted to the first communication unit that is able to be carried by the user.

8. An electrified vehicle management system comprising:
a power station provided in an entertainment facility; and
an electrified vehicle management device configured for managing a power control of an electrified vehicle, the power control being a request to the electrified vehicle to perform the power control including at least one of power supply to a power system and a charging from the power system, the electrified vehicle is configured to perform the power control including performing at least one of the power supply to the power system and the charging from the power system, wherein
the electrified vehicle management device includes
a second communication unit for communicating with a first communication unit of a user of the electrified vehicle, and
a control unit configured for controlling the second communication unit, the control unit being configured to control the second communication unit such that, when a predetermined condition is satisfied regarding the power control in the power station, a permission signal that permits receiving a privilege in the entertainment facility is transmitted to the first communication unit of the user,
wherein the predetermined condition includes that the user responds to a power supply and demand adjusting request from the power system and that the electrified vehicle is electrically connected to the power station.

* * * * *